(12) United States Patent
Neuman

(10) Patent No.: US 6,974,140 B2
(45) Date of Patent: Dec. 13, 2005

(54) MODULAR MULTIPLE DOLLY MOVING SYSTEM

(76) Inventor: Timothy Neuman, 18489 Ramona View Dr., Ramona, CA (US) 92065

( * ) Notice: Subject to any disclaimer, the term of this patent is extended or adjusted under 35 U.S.C. 154(b) by 109 days.

(21) Appl. No.: 10/754,957

(22) Filed: Jan. 12, 2004

(65) Prior Publication Data

US 2005/0151336 A1    Jul. 14, 2005

(51) Int. Cl.[7] .......................... C10G 51/06; C10G 1/08; B65D 19/44; F16B 12/36; B60P 1/00
(52) U.S. Cl. ........................ 280/79.11; 280/47.34; 280/656; 280/408; 108/55.1; 108/55.5; 108/64; 108/901; 403/294; 403/322.2; 403/327; 403/361; 414/537
(58) Field of Search .................. 280/79.11, 47.34, 280/43.12, 656, 408; 108/55.1, 55.5, 53.3, 108/53.4, 56.1, 64, 189, 901; 403/294, 297, 403/361, 322.2, 327, 328; 414/537

(56) References Cited

U.S. PATENT DOCUMENTS

| | | | | |
|---|---|---|---|---|
| 3,301,200 A | * | 1/1967 | Landsiedel | 108/56.1 |
| 3,622,114 A | * | 11/1971 | McIntire, Jr. | 248/346.02 |
| 4,127,202 A | * | 11/1978 | Jennings et al. | 414/537 |
| 4,203,609 A | * | 5/1980 | Mitchell et al. | 280/47.11 |
| 4,720,115 A | * | 1/1988 | Rehrig | 280/79.11 |
| 5,253,887 A | * | 10/1993 | Marenger | 280/79.3 |
| 5,556,118 A | * | 9/1996 | Kern et al. | 280/47.16 |
| 5,921,566 A | * | 7/1999 | Kern et al. | 280/79.11 |
| 6,079,941 A | * | 6/2000 | Lee | 414/812 |
| 6,109,846 A | * | 8/2000 | Davis et al. | 410/100 |
| 6,206,385 B1 | * | 3/2001 | Kern et al. | 280/47.35 |
| 6,511,092 B1 | * | 1/2003 | Chepa | 280/656 |
| 6,550,794 B1 | * | 4/2003 | Spindel et al. | 280/79.11 |

FOREIGN PATENT DOCUMENTS

GB    2171064 A  *  8/1986  ............ B62B 3/02

* cited by examiner

Primary Examiner—Christopher P. Ellis
Assistant Examiner—G B Klebe
(74) Attorney, Agent, or Firm—Steven W. Webb

(57) ABSTRACT

A modular dolly moving system is shown, which is composed of one or more dollies connected together with connector rods. The dollies are capable of accepting industry-standard e-track connectors used with cargo belts, and the dollies can be fitted with a variety of cart bars and cart handles.

6 Claims, 9 Drawing Sheets

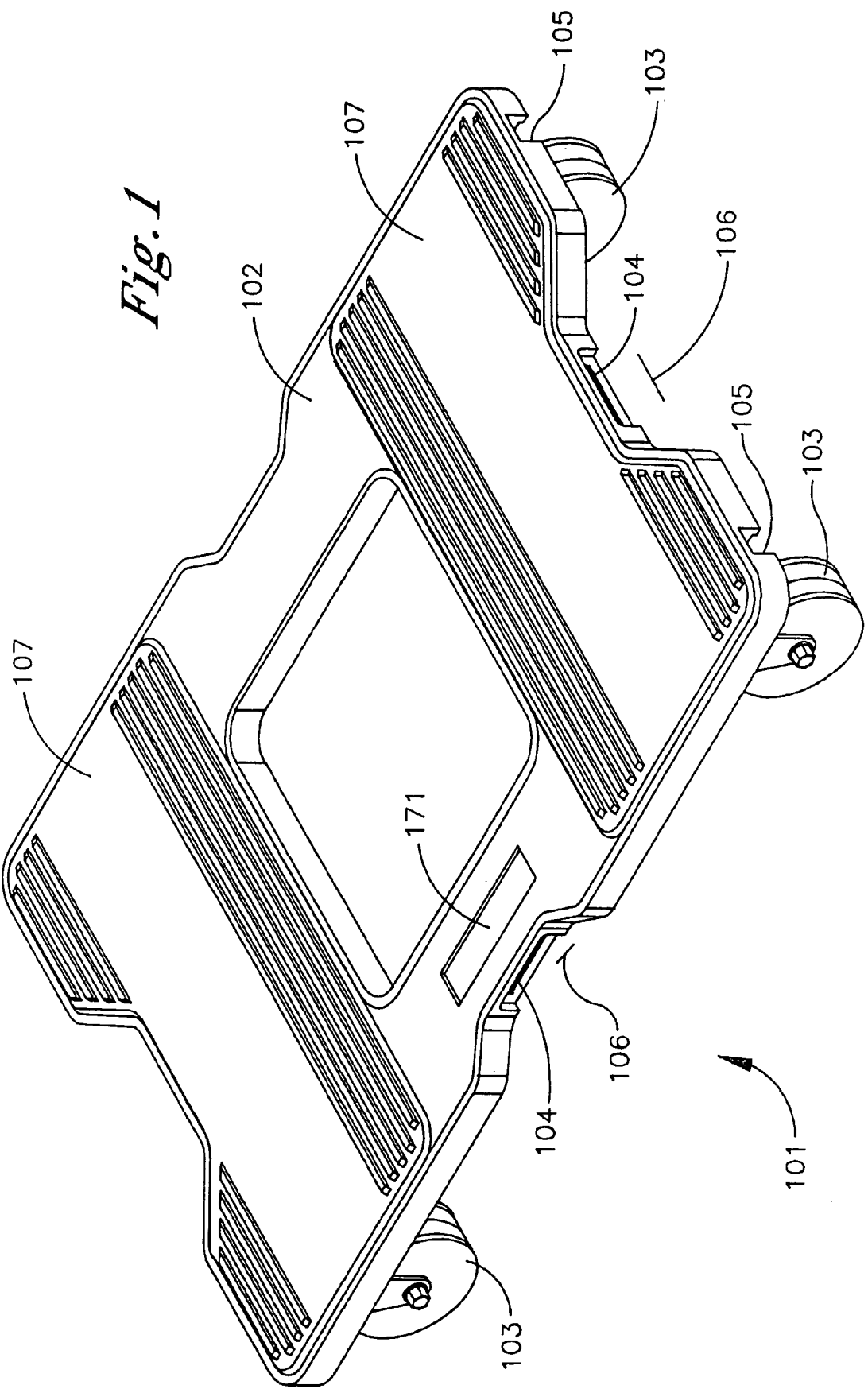

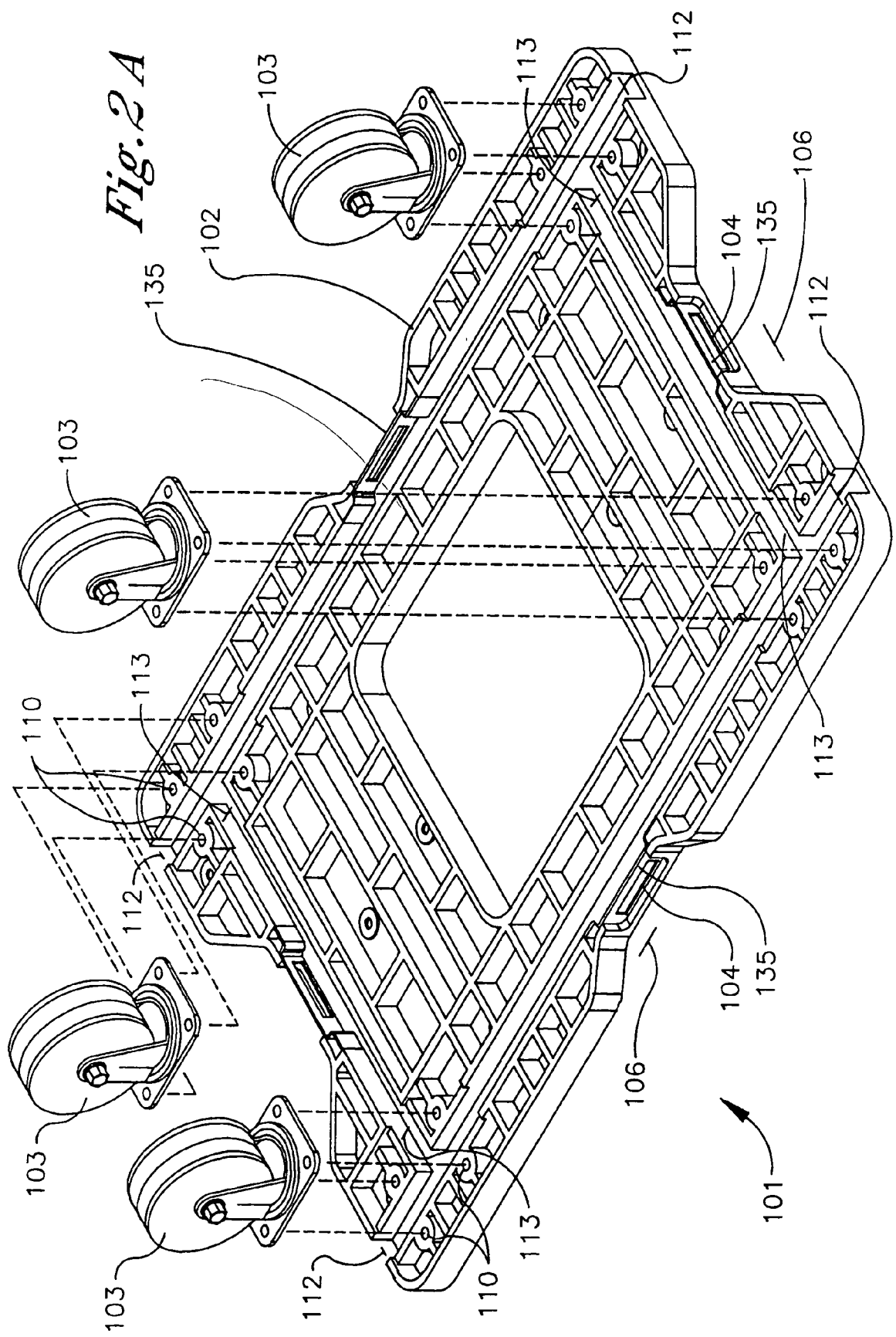

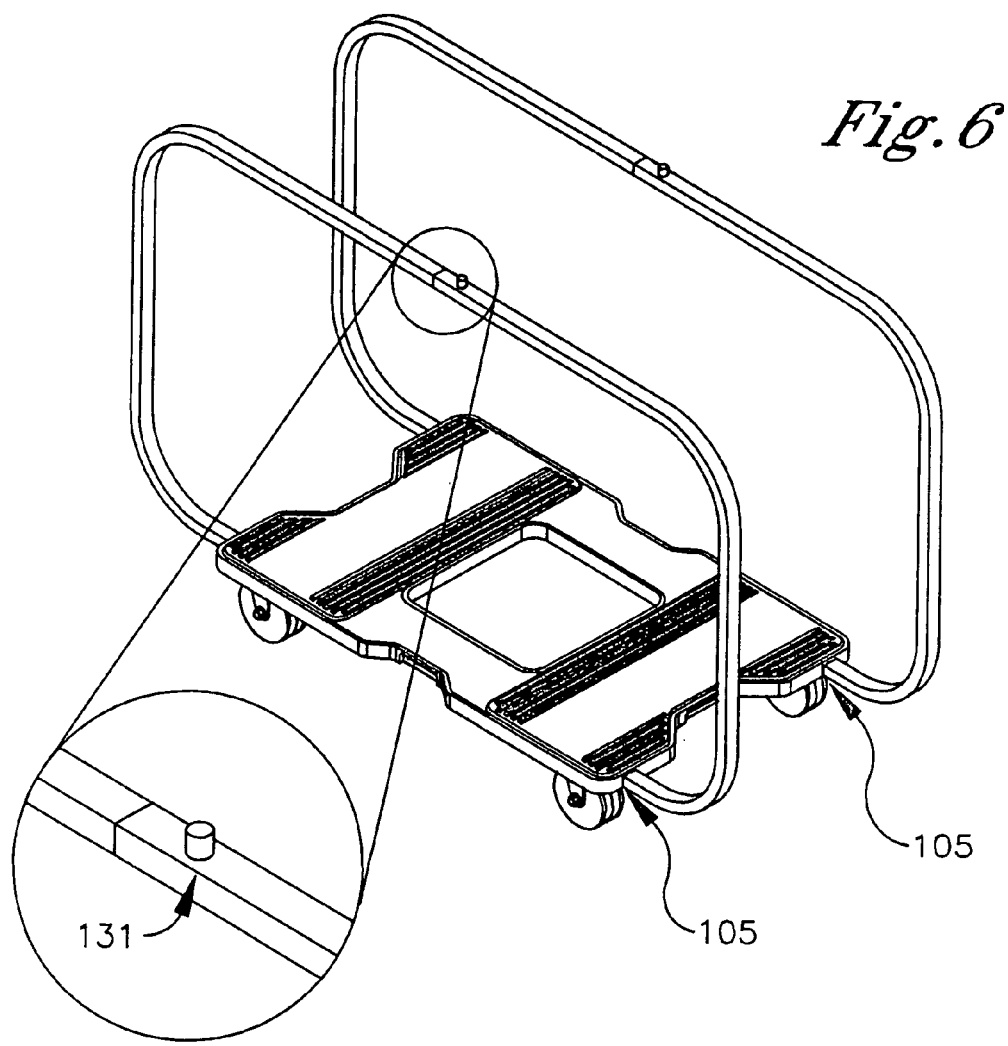
Fig. 6
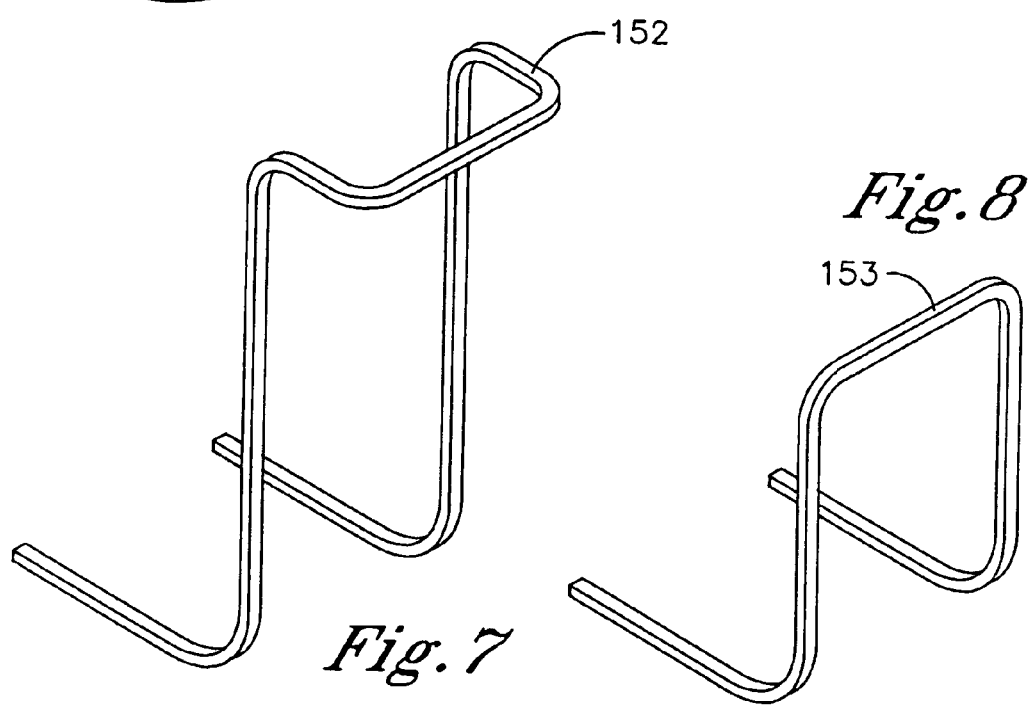
Fig. 7
Fig. 8

MODULAR MULTIPLE DOLLY MOVING SYSTEM

BACKGROUND OF THE INVENTION

This invention relates to plastic and metal dollies with modular handle and connector attachments.

The state of the art in constructing dollies for moving large items revolves around plastic, metal, and wood components, rolling caster wheels, and handles for controlling the dolly. Kern et al. In U.S. Pat. No. 5,921,566 teaches a one-piece plastic framed dolly that is inexpensive to manufacture and light-weight. Rehrig in U.S. Pat. No. 4,720,115 teaches a plastic dolly with separately cast components bound together with lap joints. These are standard dolly systems using materials other than wood.

The wooden dolly is well known, used in all moving applications and can be built of rough wood and plywood. Kern et al. In U.S. Pat. No. 5,556,118 and also in U.S. Pat. No. 6,206,385 show flat bed carts with variable handles. The state of the art does not include a metal and plastic dolly system with detachable modular handles and cargo restraints. The art also does not show a system of dollies that are attachable to each other in series by means of metal connector rods.

BRIEF SUMMARY OF THE INVENTION

It is an object of this invention to provide a metal and plastic dolly that is inexpensive to cast and assemble.

It is a further object of this invention to provide a dolly that is capable of receiving specialized protective padding on its upper surface.

It is a further object of this invention to provide a new dolly system that permits two or more dollies to be connected to each other rigidly to form a longer or wider supporting surface for moving objects.

It is a further object of this invention to provide a dolly that will accept multiple types of control handles and/or cargo restraint handles.

It is a further object of this invention to provide a dolly that has e-track connectors built in to the metal frame of the dolly body to facilitate attachment of e-track-connector-ended cargo straps.

Further objects of this invention can be discerned by perusing the detailed description, drawings, specifications and claims of this application.

BRIEF DESCRIPTION OF THE DRAWINGS

The construction and operation of the invention can be readily appreciated from inspection of the drawings that accompany this application, combined with the detailed specification to follow.

FIG. 1 is a perspective drawing of the preferred embodiment of the invention.

FIG. 2A is a perspective exploded view of the underside of the invention

FIG. 6 is a perspective drawing of the invention with cargo restraints attached

FIG. 7 is a drawing of a typical control handle

FIG. 8 is a drawing of a typical control handle

DETAILED DESCRIPTION OF THE INVENTION

Figure 2B:
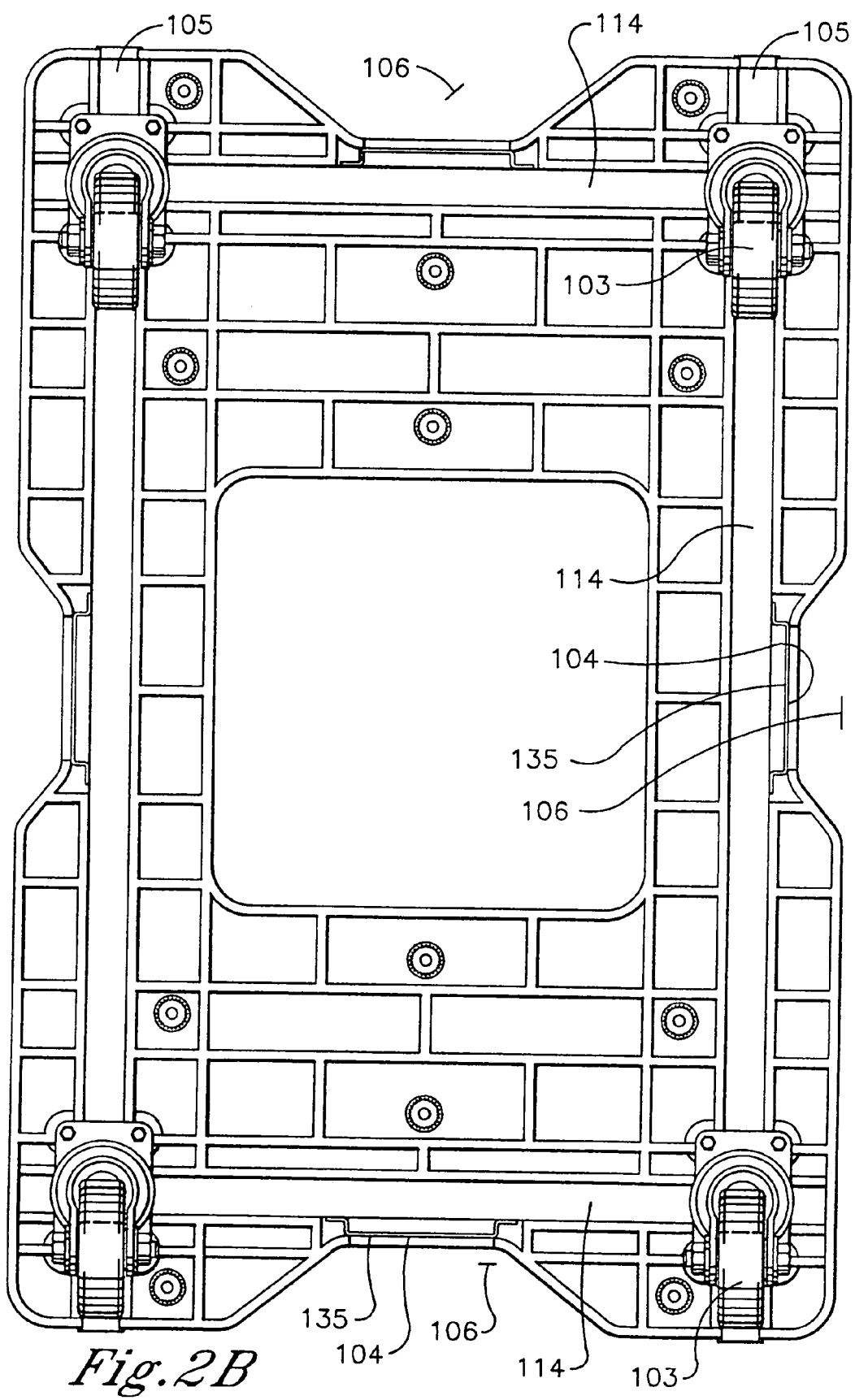
FIG. 2B is a bottom view of the underside of the invention

The invention is best described by referring to the preferred embodiment illustrated in the drawings. Referring to FIG. 1, the invention, a modular dolly system$^{101}$ is composed of a dolly bed$^{102}$, a plurality of rolling caster wheels$^{103}$, a plurality of e-track recesses$^{106}$, a plurality of e-track connector slots$^{104}$, a plurality of modular connectors$^{105}$, and one or more cover panels$^{107}$.

In FIG. 2A and FIG. 2B, the underside of the invention is shown.

The rolling caster wheels$^{103}$ are connected removably to a plurality of caster attachment points$^{110}$. There are four grooves in the underside of the dolly bed$^{102}$. There are two longitudinal grooves$^{112}$ and two transverse grooves$^{113}$. A metal frame$^{114}$ is laid in the grooves such that the metal frame$^{114}$ fills the grooves. The metal frame$^{114}$ is a hollow tube with a rectangular cross-section. The metal frame$^{114}$ terminates in modular connectors 105 capable of receiving double spring ball connectors$^{131}$ (shown in FIG. 6). The metal frame also possesses embedded e-track receptors$^{135}$ opposite the e-track connector slots$^{104}$ in the dolly bed$^{102}$. E-track-type belts can be attached to the invention$^{101}$ by passing the e-track connector terminating the belt through the e-track connector slot $^{104}$ to insert in the e-track receptor $^{135}$.

Figure 3:
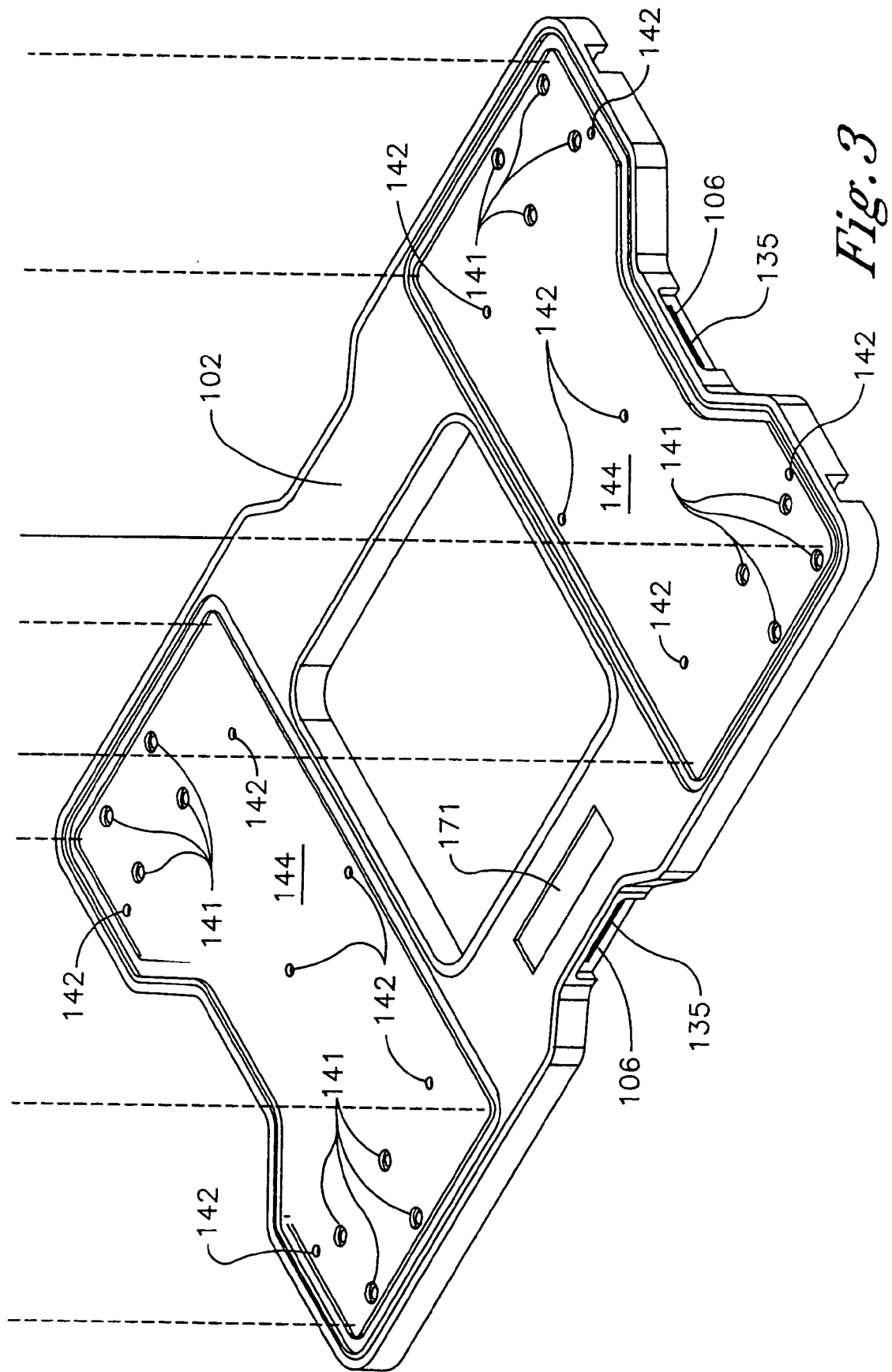
FIG. 3 is the first of a sequence of exploded view drawings
Figure 4:
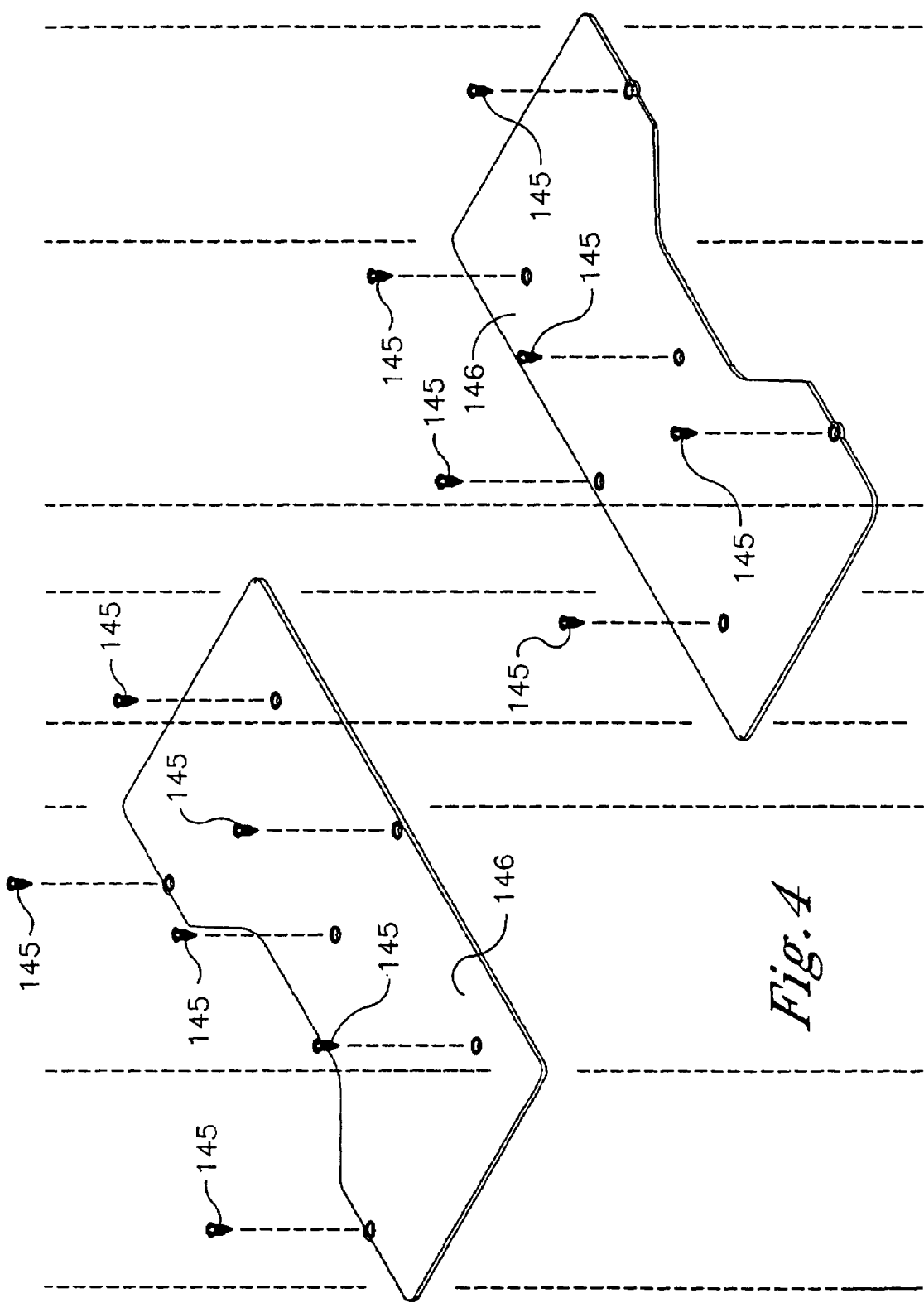
FIG. 4 is the second of a sequence of exploded view drawings
Figure 5:
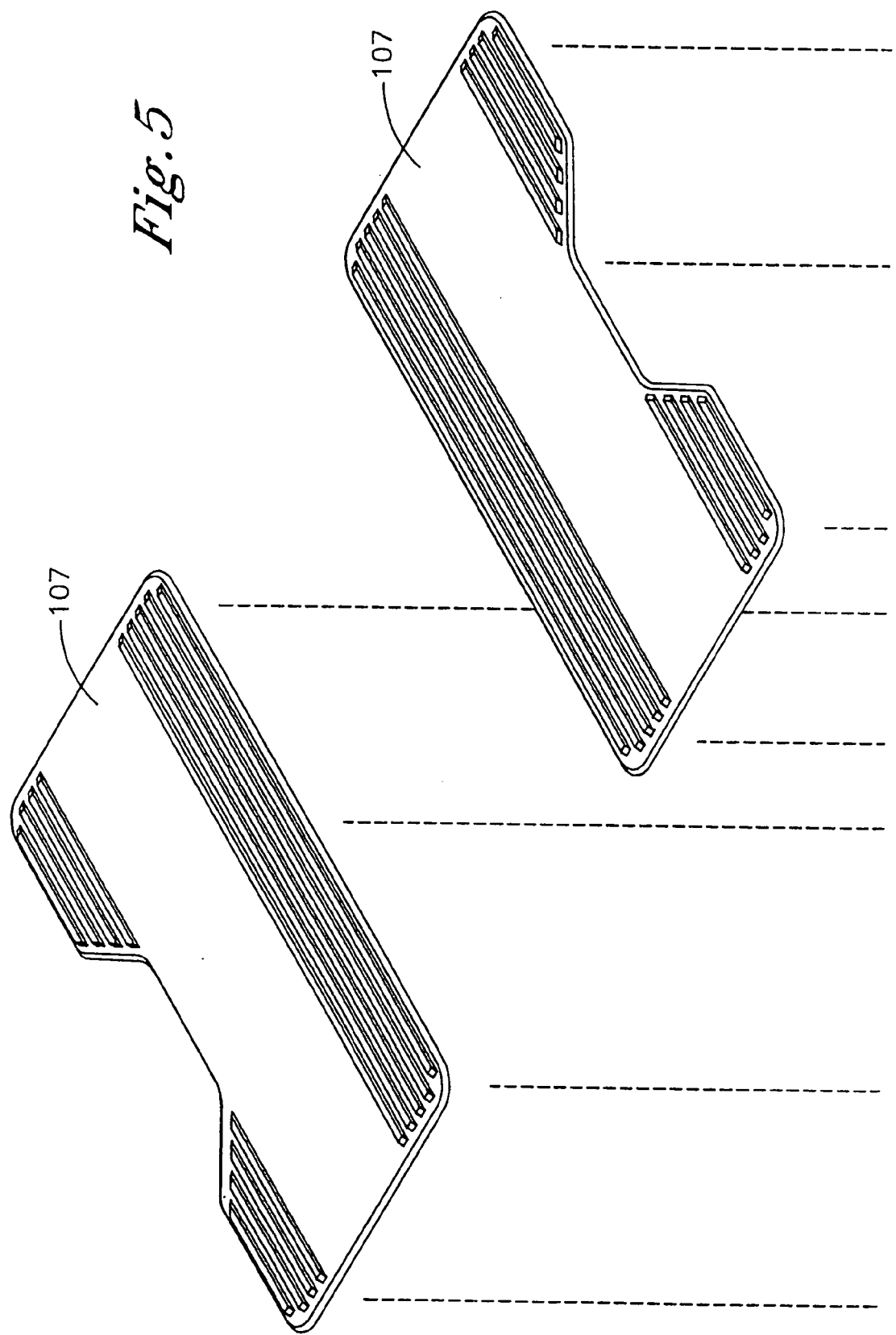
FIG. 5 is the third of a sequence of exploded view drawings

In FIG. 3, the upper surface of the dolly bed$^{102}$ is shown with the cover panels$^{107}$ removed. Revealed are the upper ends$^{141}$ of the caster attachment points$^{110}$ and a plurality of substrate attachment points$^{142}$. There are two flat substrate recesses$^{144}$ that receive a substrate panel$^{146}$ (FIG. 4) attached removably to the dolly bed$^{102}$ with attachment screws$^{145}$. In FIG. 5, the cover panels$^{107}$ are fit removably over the substrate panel$^{146}$ by stretching the cover panels over the edges of the substrate panel$^{146}$.

In FIG. 6, two typical cart bars$^{151}$ are shown attached to the invention by inserting the bottom ends of the cart bars$^{151}$ are inserted into the modular connectors$^{105}$ in the metal frame$^{114}$ and held in place with the double spring ball connectors$^{131}$.

In FIG. 7 and FIG. 8, two typical cart handles$^{152,153}$ are shown, which attach to the invention$^{101}$ at the modular connectors 105 via the double spring ball connector$^{131}$.

Figure 9:
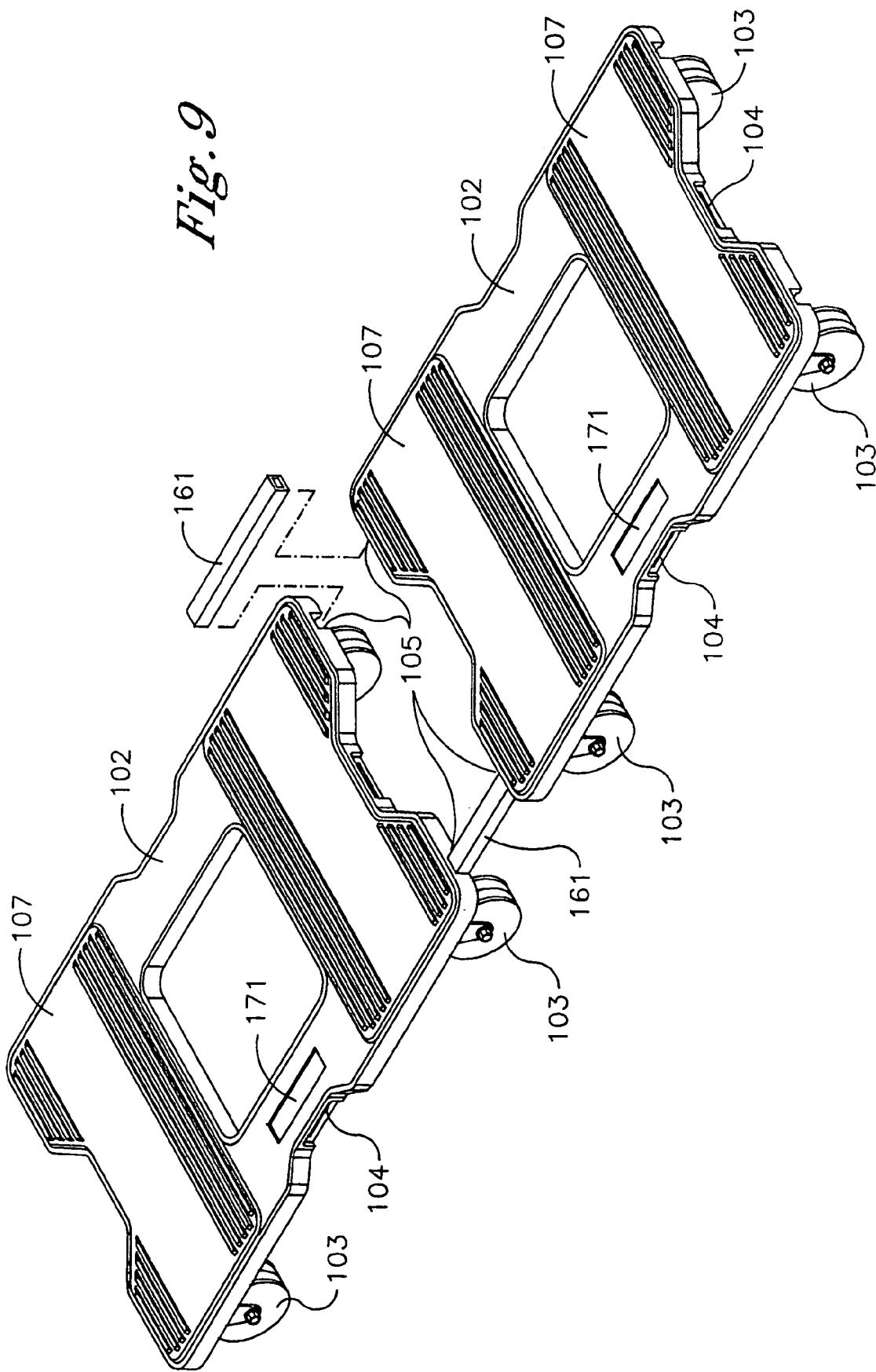
FIG. 9 is a drawing of two dollies connected together

FIG. 9 shows two of the inventions$^{101}$ connected to each other with modular connector bars$^{161}$ which attach at the modular connectors$^{105}$ and are held in place with double spring ball connectors$^{131}$.

Figure 10:
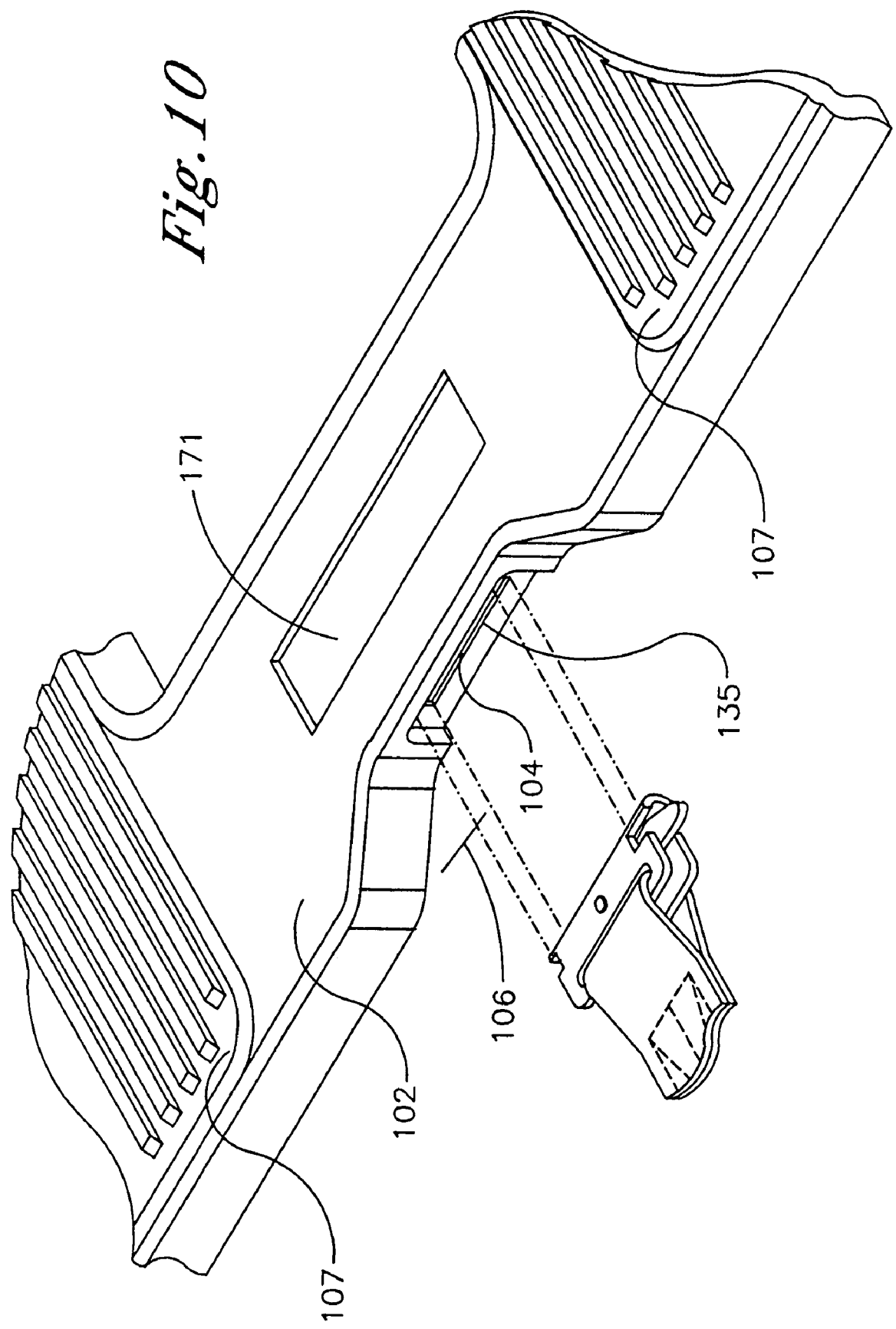
FIG. 10 is a close-up of dolly showing the e-track connector

FIG. 10 shows in close-up a typical e-track connector inserted through the e-track connector slot$^{104}$ into the e-track receptor 135 in the metal frame$^{114}$.

The invention posses a name plate recess$^{171}$ on the upper surface of the dolly bed$^{102}$. This recess$^{171}$ will accept name plates supplied by purchasers for customized versions of the invention$^{101}$.

While the foregoing describes a preferred embodiment of the invention, variation on this design and equivalent designs may be resorted to in the scope and spirit of the claimed invention.

What is claimed is:

1. A modular dolly comprised of a dolly bed, a plurality of caster wheels, a metal frame, a plurality of cart bars, a plurality of cart handles, and one or more cover panels, the dolly bed cast from plastic material, the dolly bed possessing a substantially rectangular shape, the dolly bed possessing a name plate recess, a plurality of e-track recesses, a plurality of e-track connector slots, the e-track recesses being indentations in the sides of the dolly bed, one e-track connector slot per e-track recess, and one or more cover panel recesses, the caster wheels selected from industry-standard caster wheels, the caster wheels connected removably to the underside of the dolly bed, the metal frame fitted fixedly to the underside of the dolly bed, the metal frame comprised of hollow metal tubing with a rectangular cross-section, the metal frame possessing e-track receptors that are positioned to match the placement of the e-track connector slots on the dolly bed, the metal frame terminating in a plurality of modular connectors, the modular connectors extending to the edge of the dolly bed, the modular connectors capable of receiving and locking double spring ball connectors.

2. The modular dolly of claim 1, where the metal frame is comprised of aluminum tubing or stainless steel.

3. The modular dolly of claim 1 where the cart bars and cart handles are made from metal tubing with a smaller cross-section than the metal frame, the cart bars and cart handles possessing double spring ball connectors on the ends of the metal tubing that can be inserted into the modular connectors in the metal frame.

4. The modular dolly of claim 1, where the cover panel recesses are fitted into the top surface of the dolly bed, the cover panel recesses shaped to accept a substrate panel, the substrate panel held removably in the cover panel substrate recess by screw thread bolts, cover panels fitted removably over the substrate panels by stretching the cover panel to fit around the edges of the substrate panels.

5. The modular dolly of claim 1, where the cover panel recesses are fitted into the top surface of the dolly bed, the cover panel recesses shaped to accept a cover panel, the cover panel held removably in the cover panel substrate recess by screw thread bolts.

6. A modular dolly system, comprised of a plurality of modular dollies as in claim 1, the modular dollies connected to each other by means of modular dolly connector bars, the modular dolly connector bars comprised of straight hollow metal tubes with a smaller cross-section than the metal frame, the modular dolly connector bars possessing double spring ball connectors at each end, the modular dolly system assembled by means of connecting two or more modular dollies together by inserting modular dolly connector bars into the metal frame of one modular dolly and inserting the other ends of the modular dolly connector bars into the metal frame of the other modular dolly.

* * * * *